(12) United States Patent
Bhuwania et al.

(10) Patent No.: US 10,843,129 B2
(45) Date of Patent: Nov. 24, 2020

(54) SYSTEMS AND METHODS TO REMOVE MERCAPTANS FROM SOUR GAS USING MEMBRANES

(71) Applicant: Chevron U.S.A. Inc., San Ramon, CA (US)

(72) Inventors: Nitesh Bhuwania, Richmond, CA (US); Shabbir Husain, Houston, TX (US); Daniel Chinn, Danville, CA (US); Ronald P. MacDonald, Mill Valley, CA (US); Tapan K. Das, Albany, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 103 days.

(21) Appl. No.: 15/972,262

(22) Filed: May 7, 2018

(65) Prior Publication Data
US 2019/0105603 A1    Apr. 11, 2019

Related U.S. Application Data

(60) Provisional application No. 62/569,711, filed on Oct. 9, 2017.

(51) Int. Cl.
*B01D 53/22* (2006.01)
*B01D 53/04* (2006.01)
(Continued)

(52) U.S. Cl.
CPC ....... *B01D 53/229* (2013.01); *B01D 53/0438* (2013.01); *B01D 53/228* (2013.01); *B01D 53/261* (2013.01); *B01D 53/52* (2013.01); *B01D 53/75* (2013.01); *B01D 53/78* (2013.01); *C01B 17/0404* (2013.01); *C10L 3/103* (2013.01); *C10L 3/106* (2013.01);
(Continued)

(58) Field of Classification Search
CPC ............ B01D 53/1456; B01D 53/1468; B01D 53/1487; B01D 53/22; B01D 53/228; B01D 53/229; B01D 53/48; B01D 53/52; B01D 2257/304; B01D 2257/306; B01D 2257/80; C10L 3/103; C10L 3/106; C10L 2290/542; C10L 2290/543; C10L 2290/548; E21B 43/34; E21B 43/40
See application file for complete search history.

(56) References Cited

U.S. PATENT DOCUMENTS

| 8,869,890 B2 | 10/2014 | Chinn et al. | |
| 2005/0109206 A1* | 5/2005 | Thomas | B01D 53/04 95/135 |

(Continued)

OTHER PUBLICATIONS

KZ Office Action, dated Nov. 26, 2019, during the prosecution of KZ Application No. 180679.1.

*Primary Examiner* — Jason M Greene
(74) *Attorney, Agent, or Firm* — Jason M. Guerrero

(57) ABSTRACT

Disclosed are systems and methods for processing gas produced from oil and gas reservoirs while removing mercaptans from the gas. Mercaptan-selective membranes are used to debottleneck known systems and methods by removing mercaptans from bottlenecked plant process steps including LPG fractionation and mercaptan sweetening. Hydrogen sulfide can be simultaneously removed by the membranes. Production of on specification LPG and sales gases can be increased.

3 Claims, 2 Drawing Sheets

(51) Int. Cl.
  C01B 17/04  (2006.01)
  C10L 3/10  (2006.01)
  B01D 53/75  (2006.01)
  B01D 53/26  (2006.01)
  B01D 53/78  (2006.01)
  B01D 53/52  (2006.01)
(52) U.S. Cl.
  CPC .. *B01D 2253/108* (2013.01); *B01D 2253/116* (2013.01); *B01D 2257/304* (2013.01); *B01D 2257/80* (2013.01); *B01D 2259/4009* (2013.01); *C10L 2290/06* (2013.01); *C10L 2290/542* (2013.01); *C10L 2290/543* (2013.01); *C10L 2290/548* (2013.01)

(56) References Cited

U.S. PATENT DOCUMENTS

| | | | |
|---|---|---|---|
| 2012/0168154 A1* | 7/2012 | Chinn | B01D 53/229 166/267 |
| 2018/0043304 A1* | 2/2018 | Klok | B01D 53/48 |
| 2018/0222822 A1* | 8/2018 | van Wagensveld | B01D 53/1487 |
| 2018/0318756 A1* | 11/2018 | Wadman | B01D 53/1487 |
| 2018/0363978 A1 | 12/2018 | Ballaguet et al. | |
| 2019/0054416 A1* | 2/2019 | Maher | B01D 53/229 |

\* cited by examiner

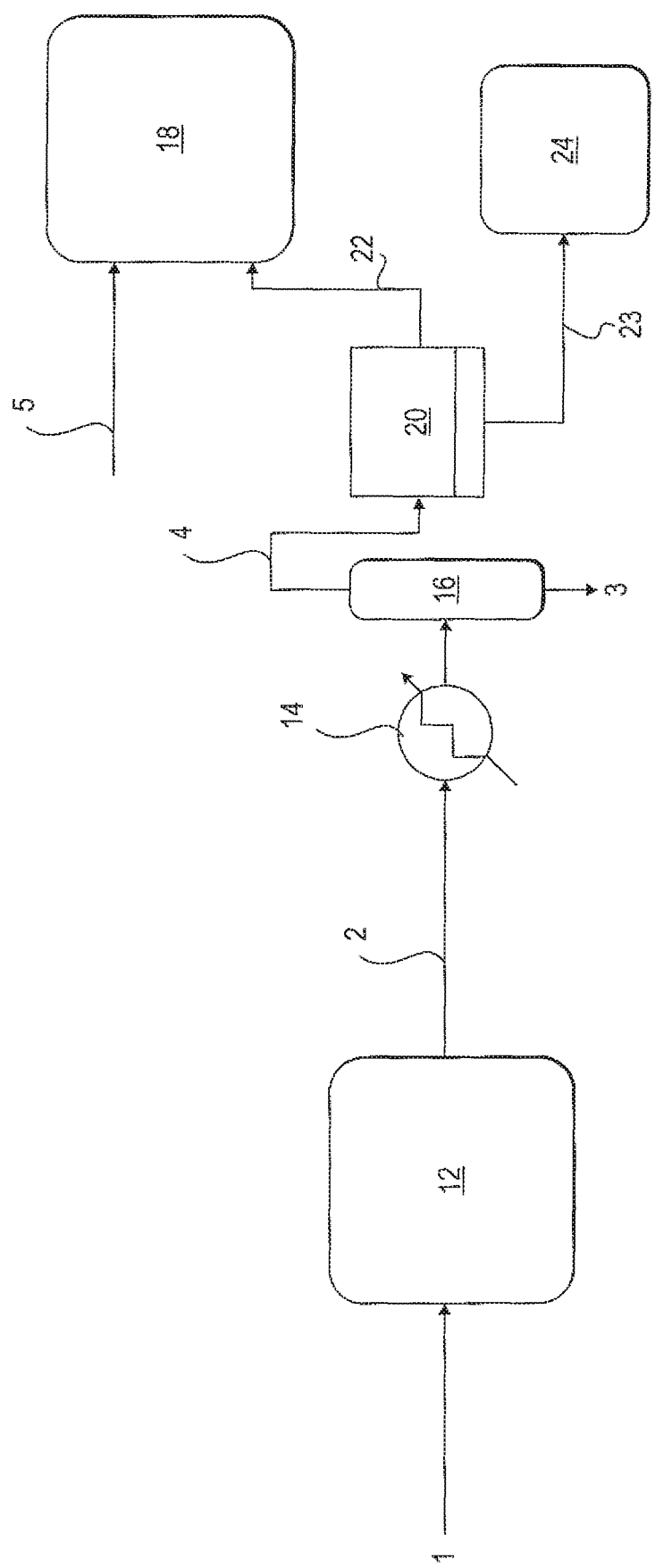

SYSTEMS AND METHODS TO REMOVE MERCAPTANS FROM SOUR GAS USING MEMBRANES

FIELD

The present disclosure relates generally to the field of systems and methods for producing oil and gas from oil and gas reservoirs while removing mercaptans and hydrogen sulfide from produced fluids produced from the oil and gas reservoirs. The present disclosure further relates to the use of membranes in such systems and methods.

BACKGROUND

Production of fluids from oil and gas reservoirs containing high levels of hydrogen sulfide ($H_2S$) requires the separation of the $H_2S$ from both the produced oil and the produced natural gas and the safe disposal thereof. There are at least two widely practiced methods of processing natural gas with high $H_2S$. In one known method, the entire $H_2S$-containing natural gas stream (also referred to herein as sour gas) is dehydrated, compressed, and reinjected at high pressure in an underground formation. In another known method, the gas is sweetened in an amine unit using amine scrubbing, followed by dehydration and optionally fractionation to extract propane and butane prior to being sold as sales gas (containing mostly methane, ethane and some nitrogen). Along with the high $H_2S$, fluids from oil and gas reservoirs are also known to contain high levels, e.g., from a hundred to thousands of ppm, methyl and ethyl and other higher molecular weight mercaptans. Mercaptans are known for its odor and hazardous nature, which makes it a health, environmental, and safety risk. Typically, methyl and ethyl mercaptans are removed from crude oil/associated gases as they are larger in quantities than other higher molecular weight mercaptans which are below the detection limits.

There are some major challenges known in the art for processing gas feeds containing mercaptans, where the mercaptans are carried through the process and end up mostly in the condensate/Liquid Petroleum Gas (LPG). The LPG is processed in the $C_2$ and $C_3$ splitters in the fractionation units. Due to the tight sales product specification for LPG, the mercaptans in the feed need to be treated using a caustic circulation process to convert the mercaptans to di-sulfides which remain in the spent caustic and are later recovered. The resultant product specification for mercaptan content is in the tens of ppm.

Current treatments for mercaptan in gas processing plants are done using the caustic treatment and a vendor proprietary catalyst on the LPG. The treatment for mercaptan (mercaptan sweetening) is done downstream of the amine and dehydration units hence any upfront bulk removal of mercaptan would help debottleneck not only the mercaptan sweetening, but also would provide greater reliability for achieving mercaptan specifications in the LPG.

It would be desirable to find ways to avoid the aforementioned challenges.

SUMMARY

In one aspect, a system is provided for increasing on-specification production of sales gas in an oil and gas production plant including mercaptan removal. The system includes a molecular sieve dehydration unit comprising at least one vessel in adsorption mode and at least one vessel in regeneration mode for dehydrating a stream of sweet gas; a cooler for cooling a regeneration gas from the molecular sieve dehydration unit to form a cooled stream; a knockout drum to separate the cooled stream into liquid water and a gas stream; a mercaptan-selective membrane to remove mercaptans from the gas stream to form a permeate stream enriched in mercaptans and a retentate stream depleted in mercaptans and enriched in hydrocarbon gases; a fractionation unit for separating a combined gas stream comprising the retentate stream and a stream of dehydrated sweet gas from the molecular sieve dehydration unit into comprising propane and butane and sales gas comprising methane, ethane and some nitrogen and treating the combined gas stream with a caustic treatment to further remove mercaptans from the combined gas stream; and a Claus unit for removing sulfur from the permeate stream enriched in mercaptans and producing elemental sulfur.

In another aspect, a method is provided for increasing on-specification production of sales gas in an oil and gas production plant including mercaptan removal. The method includes dehydrating a stream of sweet gas in a molecular sieve dehydration unit comprising at least one vessel in adsorption mode and at least one vessel in regeneration mode. The method further includes cooling a regeneration gas from the molecular sieve dehydration unit to form a cooled stream. The cooled stream is separated into liquid water and a gas stream. In a mercaptan-selective membrane, mercaptans are removed from the gas stream to form a permeate stream enriched in mercaptans and a retentate stream depleted in mercaptans and enriched in hydrocarbon gases. A combined gas stream including the retentate stream and a dehydrated stream of sweet gas from the molecular sieve dehydration unit is fed to a fractionation unit for separation into LPG comprising propane and butane and sales gas comprising methane, ethane and nitrogen and caustic treatment of the combined gas stream to further remove mercaptans from the combined gas stream. In a Claus unit, sulfur is removed from the permeate stream enriched in mercaptans and producing elemental sulfur.

In another aspect, a method is provided for retrofitting a gas processing plant for processing a gas stream containing from 100 to 10,000 ppm mercaptans, the gas processing plant having a molecular sieve dehydration unit having at least one vessel in adsorption mode and at least one vessel in regeneration mode for dehydrating a stream of sweet gas; a cooler for cooling a regeneration gas from the molecular sieve dehydration unit to form a cooled stream; a knockout drum to separate the cooled stream into liquid water and a gas stream; and a fractionation unit for separating the gas stream and a stream of sweet gas from the molecular sieve dehydration unit into LPG comprising propane and butane and sales gas containing methane, ethane and nitrogen and treating the gas stream and the stream of sweet gas from the molecular sieve dehydration unit with a caustic treatment to further remove mercaptans. The method of retrofitting includes adding a mercaptan-selective membrane downstream of the knockout drum and upstream of the fractionation unit to remove mercaptans from the gas stream and form a permeate stream enriched in mercaptans and a retentate stream depleted in mercaptans and enriched in hydrocarbon gases, such that a reduced amount of mercaptans is sent to the fractionation unit than in the gas processing plant without the mercaptan-selective membrane.

BRIEF DESCRIPTION OF THE DRAWINGS

These and other objects, features and advantages of the present invention will become better understood referring to the following description and accompanying drawings. The drawings are not considered limiting of the scope of the disclosure. Reference numerals designate like or corresponding, but not necessarily identical, elements. The drawings illustrate only example embodiments. The elements and features shown in the drawings are not necessarily to scale, emphasis instead being placed upon clearly illustrating the principles of the example embodiments. Additionally, certain dimensions or positionings may be exaggerated to help visually convey such principles.

FIG. 2 shows a schematic diagram of a debottlenecked plant including a mercaptan-selective membrane for gas processing in accordance with certain example embodiments.

DETAILED DESCRIPTION

Figure 1:
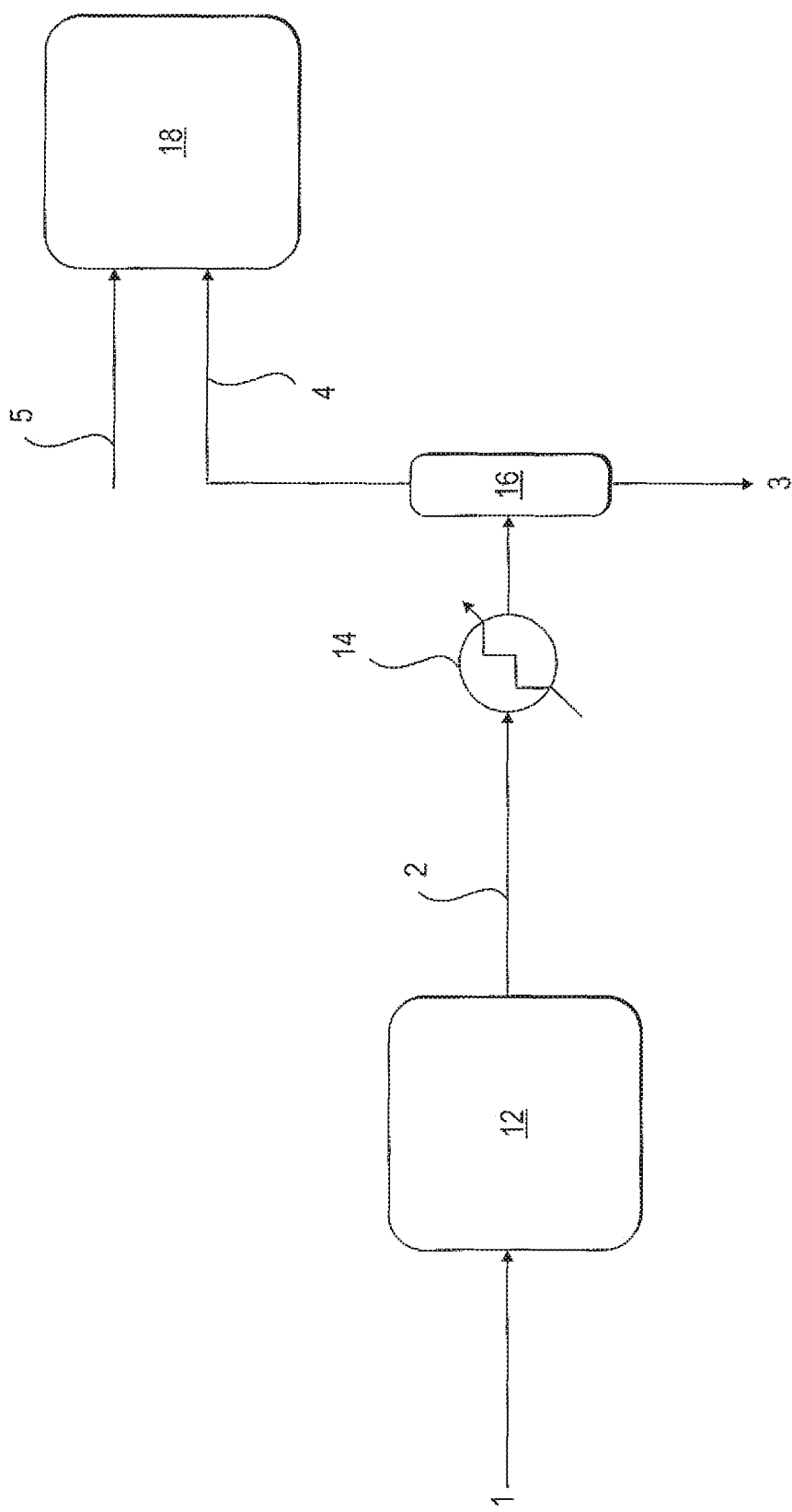
FIG. 1 shows a schematic diagram of a plant for gas processing in accordance with the prior art.

Acid gases, such as $H_2S$ and $CO_2$, are stripped from the gas streams in amine units, thus producing enriched acid gas streams and enriched hydrocarbon streams. As a non-limiting example, the acid gas stream may include a small amount of hydrocarbons, typically methane ($C_1$), water vapor, carbon dioxide ($CO_2$), and hydrogen sulfide ($H_2S$). In conventional gas processing when gas is sweetened in an amine unit (not shown) using amine scrubbing, the gas downstream of the amine unit is dehydrated in a molecular sieve dehydration unit 12 having at least two beds arranged in parallel, and each bed will have an adsorption mode and a regeneration mode. FIG. 1 shows the process when the dehydration beds are in regeneration mode. Bed 12 is saturated with water and co-adsorbed hydrocarbons including some mercaptans. A hot regeneration gas 1 is fed to dehydration bed 12 in regeneration mode. Normally, the regeneration gas 1 is a slipstream (e.g., 5 to 10% of the flowrate) of the dried gas obtained from adsorption mode that is heated to high temperatures and fed into the bed to be regenerated in a counter-current direction relative to the feed during adsorption mode.

Hot residue regeneration gas 2 from the dehydration beds 12 is then cooled in cooler 14 and passed to a knockout drum 16 where gas stream 4 and liquid water 3 are separated. The regeneration gas 4 is normally blended back with the dehydrated sweet gas feed 5 coming from the dehydration beds in adsorption mode (not shown) to a fractionation unit 18 for LPG (liquid petroleum gas) fractionation and mercaptan sweetening. Stream 5 represents the majority of the dry gas flow. Stream 5 is dry, sweet associated gas that still has mercaptans in it. It goes to fractionation unit 18 which produces $C_3$ and $C_4$ products along with a lean sweet gas of $C_1$ and $C_2$. Mercaptans tend to accumulate in the $C_3$ and $C_4$ fractions, so a caustic system is used to ensure the mercaptan specification is met. In fractionation unit 18, LPG, i.e., propane and butane are extracted from the dry gas, also forming a sales gas containing mostly methane, ethane and some nitrogen. The gas stream 4 can contain elevated levels of mercaptans with minimal $H_2S$, since during regeneration the hot gas desorbs water and any co-adsorbed mercaptans. If so, by returning stream 4 to the fractionation unit 18, the mercaptans therein will be further concentrated in the LPG, resulting in increasing the treatment load for the mercaptan sweetening process and/or off-spec product. Specifications can be less than 35 ppm methyl and ethyl mercaptan.

Another issue known in the art is the mercaptan co-adsorption in the molecular sieve dehydration unit 12. The mercaptan co-adsorption interferes with the dehydration performance of the molecular sieves, which can cause plant upsets resulting in mercaptan spikes or elevated levels of mercaptan. An example of a molecular sieve is zeolite 4A/5A.

Referring to FIG. 2, in one embodiment, a mercaptan-selective membrane 20 is added to the section of the gas processing plant shown in FIG. 1, for receiving the cooled regeneration gas 4 from the knockout drum 16 and forming a retentate stream 22 depleted in mercaptans and a permeate stream 23 enriched in mercaptans. The membrane 20 removes mercaptans from gas stream 4. Removing mercaptans before the LPG fractionation unit 18 will prevent overloading the mercaptan sweetening process for LPG. The permeate stream 23 can be further processed in a Claus unit 24. The Claus unit 24 converts hydrocarbons to $CO_2$ and $H_2O$, $H_2S$ to sulfur and water, and mercaptans to $H_2O$, $CO_2$, $H_2S$ and $SO_2$ which are in turn converted to $H_2O$, $CO_2$, and S. Thus, the Claus unit may convert at least a portion of the mercaptans and $H_2S$ into elemental sulfur, which may be subsequently transported and sold for commercial uses like fertilizer and sulfuric acid. The permeate gas 23 going to Claus unit 24 will have a limitation on the percentage of hydrocarbons going in, as Claus units generally have a low tolerance of hydrocarbons in the acid gas. However, since the mercaptans level going in to Claus is at the ppm level ($H_2S$ and $CO_2$ make up the majority), the impact will be limited.

Systems and methods using the mercaptan selective membrane 20 advantageously debottleneck the mercaptan sweetening (caustic treatment) in the fractionation unit 18 of a gas processing plant.

Use of such membranes upstream of the amine unit in a gas processing plant can enable simultaneous bulk co-removal of mercaptans and $H_2S$, debottlenecking multiple unit operations, including amine units, Claus plants, fractionation units and molecular sieve dehydration units.

The mercaptan selective membrane 20 may be any polymeric membrane known for use in membranes, including but not limited to cellulose acetate, cellulose triacetate, polyimide or rubbery membranes such as polyether block amide (PEBA, e.g., Pebax® available from Arkema Inc., King of Prussia, Pa.) and polyurethanes that preferentially permeates mercaptans over hydrocarbons such as methane, ethane, propane and butane. The membranes can have a mixed-gas inercaptan/$CH_4$ selectivity of 10 or greater when measured at 35° C. and 300 psig feed. In another embodiment, the selectivity is at least 20. With respect to the form of the membrane, by way of example and not limitation, the form of the membrane may be a hollow fiber or spiral wound. Those skilled in the art of membrane separation of gases will appreciate that other configuration of membranes may be used to separate gases.

In one embodiment, the bottlenecked plant section shown in FIG. 1 can be retrofit to obtain the debottlenecked plant section shown in FIG. 2. In order to accomplish the retrofit, line 4 is disconnected downstream of knockout drum 16 and reconnected to the inlet of the membrane 20. The retentate outlet of the membrane 20 is connected to the inlet of the fractionation unit 18. The permeate outlet of the membrane 20 is connected to the inlet of the Claus unit 24. A valve (not shown) can be installed between the membrane 20 and the Claus unit 24 for controlling the permeate pressure.

It should be noted that only the components relevant to the disclosure are shown in the figures, and that many other components normally part of a gas processing, an oil processing and/or a gas injection system are not shown for simplicity. From the above description, those skilled in the art will perceive improvements, changes and modifications.

For the purposes of this specification, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

What is claimed is:

1. A system for increasing on-specification production of sales gas in an oil and gas production plant including mercaptan removal, comprising:
   (a) a molecular sieve dehydration unit comprising at least one vessel in adsorption mode and at least one vessel in regeneration mode for dehydrating a stream of sweet gas;
   (b) a cooler for cooling a regeneration gas from the molecular sieve dehydration unit to form a cooled stream;
   (c) a knockout drum to separate the cooled stream into liquid water and a gas stream;
   (d) a mercaptan-selective membrane to remove mercaptans from the gas stream to form a permeate stream enriched in mercaptans and a retentate stream depleted in mercaptans and enriched in hydrocarbon gases;
   (e) a fractionation unit for separating a combined gas stream comprising the retentate stream and a stream of dehydrated sweet gas from the molecular sieve dehydration unit into LPG comprising propane and butane and sales gas comprising methane, ethane and some nitrogen and treating the combined gas stream with a caustic treatment to further remove mercaptans from the combined gas stream; and
   (f) a Claus unit for converting mercaptans from the permeate stream into elemental sulfur.

2. A method for increasing on-specification production of sales gas in an oil and gas production plant including mercaptan removal, comprising:
   (a) dehydrating a stream of sweet gas in a molecular sieve dehydration unit comprising at least one vessel in adsorption mode and at least one vessel in regeneration mode;
   (b) cooling a regeneration gas from the molecular sieve dehydration unit to form a cooled stream;
   (c) separating the cooled stream into liquid water and a gas stream;
   (d) in a mercaptan-selective membrane, removing mercaptans from the gas stream to form a permeate stream enriched in mercaptans and a retentate stream depleted in mercaptans and enriched in hydrocarbon gases;
   (e) feeding a combined gas stream comprising the retentate stream and a dehydrated stream of sweet gas from the molecular sieve dehydration unit to a fractionation unit for separation into LPG comprising propane and butane and sales gas comprising methane, ethane and nitrogen and caustic treatment of the combined gas stream to further remove mercaptans from the combined gas stream; and
   (f) in a Claus unit, converting mercaptans from the permeate stream into elemental sulfur.

3. A method of retrofitting a gas processing plant for processing a gas stream containing from 100 to 10,000 ppm mercaptans, the gas processing plant comprising a molecular sieve dehydration unit comprising at least one vessel in adsorption mode and at least one vessel in regeneration mode for dehydrating a stream of sweet gas; a cooler for cooling a regeneration gas from the molecular sieve dehydration unit to form a cooled stream; a knockout drum to separate the cooled stream into liquid water and a gas stream; and a fractionation unit for separating the gas stream and a stream of sweet gas from the molecular sieve dehydration unit into LPG comprising propane and butane and sales gas comprising methane, ethane and nitrogen and treating the gas stream and the stream of sweet gas from the molecular sieve dehydration unit with a caustic treatment to further remove mercaptans; the method of retrofitting comprising:
   adding a mercaptan-selective membrane downstream of the knockout drum and upstream of the fractionation unit to remove mercaptans from the gas stream and form a permeate stream enriched in mercaptans and a retentate stream depleted in mercaptans and enriched in hydrocarbon gases;
   such that a reduced amount of mercaptans is sent to the fractionation unit than in the gas processing plant without the mercaptan-selective membrane.

* * * * *